United States Patent
Zhang et al.

(10) Patent No.: US 9,286,676 B2
(45) Date of Patent: Mar. 15, 2016

(54) METHOD FOR SEPARATING AND ESTIMATING MULTIPLE MOTION PARAMETERS IN X-RAY ANGIOGRAM IMAGE

(71) Applicant: Huazhong University of Science and Technology, Wuhan (CN)

(72) Inventors: Tianxu Zhang, Wuhan (CN); Yining Huang, Wuhan (CN); Zhenghua Huang, Wuhan (CN); Yaxun Wei, Wuhan (CN); Longwei Hao, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 14/698,894

(22) Filed: Apr. 29, 2015

(65) Prior Publication Data
US 2015/0317793 A1      Nov. 5, 2015

Related U.S. Application Data

(63) Continuation-in-part of application No. PCT/CN2014/085724, filed on Sep. 2, 2014.

(30) Foreign Application Priority Data

Dec. 31, 2013    (CN) .......................... 2013 1 0752751

(51) Int. Cl.
| | | |
|---|---|---|
| G06K 9/00 | (2006.01) | |
| G06T 7/00 | (2006.01) | |
| G06T 7/20 | (2006.01) | |
| G06T 5/50 | (2006.01) | |

(52) U.S. Cl.
CPC ................. *G06T 7/0012* (2013.01); *G06T 5/50* (2013.01); *G06T 7/20* (2013.01); *G06T 7/2033* (2013.01); *G06T 2207/10116* (2013.01); *G06T 2207/20224* (2013.01); *G06T 2207/30048* (2013.01); *G06T 2207/30101* (2013.01); *G06T 2211/404* (2013.01)

(58) Field of Classification Search
None
See application file for complete search history.

(56) References Cited

U.S. PATENT DOCUMENTS

| | | | | |
|---|---|---|---|---|
| 6,171,241 B1 * | 1/2001 | McVeigh | ............... | A61B 5/055 324/309 |
| 8,224,056 B2 * | 7/2012 | Pack | ..................... | G06T 7/0081 378/20 |
| 2008/0240536 A1 * | 10/2008 | Soubelet | .................. | A61B 6/12 382/132 |
| 2010/0310140 A1 * | 12/2010 | Schneider | ............ | G06K 9/6247 382/130 |

(Continued)

*Primary Examiner* — Avinash Yentrapati
(74) *Attorney, Agent, or Firm* — Matthias Scholl, PC; Matthias Scholl

(57) ABSTRACT

A method for separating and estimating multiple motion parameters in an X-ray angiogram image. The method includes: determining a cardiac motion signal cycle and a variation frame sequence of translational motion according to an angiogram image sequence, tracing structure feature points of vessels in the angiogram image sequence whereby obtaining a motion sequence, processing the motion sequence via multivariable optimization and Fourier frequency-domain filtering, separating an optimum translational motion curve, a cardiac motion curve, a respiratory motion curve and a high-frequency motion curve according to the variation frame sequence of translational motion, a cycle of the cardiac motion signal, a range of a respiratory motion signal cycle, and a range of a high-frequency motion signal cycle.

1 Claim, 10 Drawing Sheets

(56) References Cited

U.S. PATENT DOCUMENTS

2012/0189183 A1* 7/2012 Xue .................... G06T 7/0024 382/131

2013/0272591 A1* 10/2013 Xue .................... G06T 11/003 382/131

* cited by examiner

Displacement/mm    Image Frame

Displacement/mm    Image Frame

Displacement/mm     Image Frame

Displacement/mm     Image Frame

Displacement/mm    Image Frame

Displacement/mm    Image Frame

Displacement/mm       Image Frame

Displacement/mm       Image Frame

Displacement/mm    Image Frame

Displacement/mm    Image Frame

Displacement/mm       Image Frame

Displacement/mm       Image Frame

METHOD FOR SEPARATING AND ESTIMATING MULTIPLE MOTION PARAMETERS IN X-RAY ANGIOGRAM IMAGE

CROSS-REFERENCE TO RELATED APPLICATIONS

This application is a continuation-in-part of International Patent Application No. PCT/CN2014/085724 with an international filing date of Sep. 2, 2014, designating the United States, now pending, and further claims priority benefits to Chinese Patent Application No. 201310752751.4 filed Dec. 31, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates to a method for separating and estimating multiple motion parameters in an X-ray angiogram image.

2. Description of the Related Art

Respiratory motion includes inspiration motion and expiration motion formed by rhythmic inflation and deflation of a thorax. The respiratory motion may cause translational motion of the heart in a three-dimensional space. In an X-ray angiography system, two-dimensional motion of coronary vessels may occur on angiography plane. Moreover, an angiography sequence may cover the entire coronary vessels during angiography, causing two-dimensional translational motion between different frames of the imaging sequence.

Therefore, a coronary angiogram image operates to record a projection of cardiac motion on a two-dimensional plane, and superposition of two-dimensional translational motion of coronary on the angiography plane caused by respiratory motion of a human body, and two-dimensional translational motion of the patient. To obtain an accurate two-dimensional angiogram, it is beneficial to subtract cardiac motion, the respiratory motion and translational motion of the patient.

A conventional method for separating the translational motion is to conduct image registration between frames. Medical image registration methods reported in some literatures normally comprise an external registration method and an internal registration method. The external registration method sets some obvious reference points prior to angiography, and traces them during the angiography. However, this kind of labeling method is normally invasive. The internal registration method is divided into a labeling method, a segmentation method and so on after angiography is completed. The labeling method selects some anatomical structure points from an angiogram for registration, but not all angiograms have such anatomical structure points. The segmentation method can enable registration via anatomical structure lines that are segmented, and can be applicable for both rigid models and deformation models. However, it can only extract motion of the anatomical structure line, and cannot extract rigid translational motion alone. However, motion of vessel extracted from the angiogram images contains translational motion of a patient, along with physiological motion and respiratory motion of the vessel itself. Even if some angiogram images contain skeletons with no physiological motion (such as spines) as internal labeling points and it is possible to enable registration via the internal labeling method, not all the angiogram images have such a feature for registration. As no such feature exists in an angiogram image, it is difficult to extract the translational motion. Moreover, extraction of the translational motion is seldom reported in the medical image field.

It has been suggested to set labeling points before extracting human's respiratory motion, and tracing those points in sequence. One feature of the respiratory motion is that as one person breaths, some organs in his body, such as a heart, a diaphragm and so on may move along with a lung in a three-dimensional space. Therefore, a motion curve obtained by tracing structure feature points that are not to move along with the heart can be equivalent to respiratory motion. Two common-used methods in X-ray angiography comprise manually tracing non-cardiac structure feature points in the angiogram image, and simultaneously recording motion of these points during angiography. Obviously, both these two methods have defects. The former one features poor applicability: since it is impossible to ensure that a labeling point meeting the above-mentioned requirement exists in each frame of the angiogram image, and to find the labeling point requires good understanding of human's anatomical structure, it is hard to extract the respiratory motion as there is no feature point in the angiogram image. Implementation of the latter one requires large amount of experiment for controlling, which is inappropriate for normal clinical application. In addition, there is still another method that is implemented under a dual-arm X-ray angiogram, and a principle thereof for separating the cardiac motion from the respiratory motion is to conduct three-dimensional reconstruction on coronary vessels of two angiogram images at different projection angles at the same time thereby obtaining three-dimensional distribution of the vessel at that time. After all angiogram images in one respiratory cycle are matched and reconstructed, a group of three-dimensional structure sequences can be obtained, and spatial displacement vectors therebetween constitute the respiratory motion. This method can obtain comparatively reliable respiratory motion, but cannot be widely applied to medical practice due to limitation of conditions of the dual-arm X-ray angiogram.

A typical method for extracting respiratory motion parameters from x-ray angiogram image discloses Fourier frequency-domain separation. However, a residual motion curve can be regarded as respiratory motion only after the cardiac motion is extracted. In addition, it is possible to extract translational motion and high-frequency motion, and as a result, respiratory motion is inaccurate, and robustness of the method is insufficient.

SUMMARY OF THE INVENTION

In view of the above-mentioned problems, it is an objective of the invention to provide a method for separating and estimating multiple motion parameters in an X-ray angiogram image that is based on frequency-domain filtering and multi-variable optimization, and capable of accurately separating various motion parameters in a simple, fast and undamaged manner.

To achieve the above objective, in accordance with one embodiment of the invention, there is provided a method for separating and estimating multiple motion parameters in an X-ray angiogram image, comprising steps of:

(1) tracing structure feature points of vessels in a X-ray angiogram image sequence thereby obtaining tracing curves of the feature points $s_i(n)$, $i=1, \ldots, I$, $n=1, \ldots, N$; wherein I represents the number of the feature points, and N represents the number of image frames in the X-ray angiogram image sequence;

(2) obtaining a simulated translation curve $d_\alpha(n)$ according to a variation frame sequence $\{N_t, t=1, \ldots, T\}$ and a slope angle sequence $\{\alpha_t, t=1, \ldots, T-1\}$ of translational motion, where T represents the number of variations in motion directions;

(3) determining a cardiac motion signal cycle $N_c$ according to the X-ray angiogram image sequence, obtaining a multi-motion synthetic motion curve $\hat{s}_{i\alpha}^1(n)=s_i(n)-d_\alpha(n)$ without translational motion according to the tracing curve $s_i(n)$ and the simulated translation curve $d_\alpha(n)$, and processing the synthetic motion curve $\hat{s}_{i\alpha}^1(n)$ via Fourier frequency-domain filtering according to the cardiac motion signal cycle $N_c$ thereby obtaining a cardiac motion curve $\hat{c}_{i\alpha}(n)$;

(4) obtaining a residual motion curve $\hat{s}_{i\alpha}^2(n)=\hat{s}_{i\alpha}^1(n)-\hat{c}_{i\alpha}(n)$ with no translational motion signal or cardiac motion signal according to the synthetic motion curve $\hat{s}_{i\alpha}^1(n)$ and the cardiac motion curve $\hat{c}_{i\alpha}(n)$, processing the residual motion curve $\hat{s}_{i\alpha}^2(n)$ via Fourier frequency-domain filtering according to each respiratory motion signal cycle in a cycle range of $[3N_c, 10N_c]$, thereby obtaining a corresponding respiratory motion curve, obtaining an optimum respiratory motion curve $\hat{r}_{i\alpha}(n)$ and an optimum respiratory motion signal cycle $\hat{N}_{\alpha r}$, with respect to a current simulated translation curve using a fitting curve $\hat{r}'_{i\alpha}(n)$ closest to the residual motion curve $\hat{s}_{i\alpha}^2(n)$ as an optimum criteria;

(5) detecting whether an amplitude of a curve $\hat{h}'_{i\alpha}(n)=\hat{s}_{i\alpha}^2(n)-\hat{r}'_{i\alpha}(n)$ obtained according to the residual motion curve $\hat{s}_{i\alpha}^2(n)$ and the fitting curve $\hat{r}_{i\alpha}(n)$ is less than three pixels, determining there is no high-frequency component if yes, otherwise processing the residual motion curve $\hat{s}_{i\alpha}^2(n)$ via Fourier frequency-domain filtering according to each high-frequency motion signal cycle in a cycle range of $[1/7N_c, 5/7N_c]$, thereby obtaining a corresponding high-frequency motion curve, obtaining an optimum high-frequency motion curve $\hat{h}_{i\alpha}(n)$ and an optimum high-frequency motion signal cycle $N_{\alpha h}$, with respect to a current simulated translation curve using a fitting curve $\hat{h}'_{i\alpha}(n)$ closest to the high-frequency motion curve as an optimum criteria;

(6) obtaining a synthetic motion estimation curve $\hat{s}_{i\alpha}(n)=d_\alpha(n)+\hat{r}_{i\alpha}(n)+\hat{c}_{i\alpha}(n)+\hat{h}_{i\alpha}(n)$ according to the simulated translation curve $d_\alpha(n)$, the respiratory motion curve $\hat{r}_{i\alpha}(n)$, the cardiac motion curve $\hat{c}_{i\alpha}(n)$, and the high-frequency motion curve $\hat{h}_{i\alpha}(n)$, and obtaining an optimum translational motion curve, a cardiac motion curve, a respiratory motion curve, and a high-frequency motion curve using a tracing curve $s_i(n)$ closest to the synthetic motion estimation curve $\hat{s}_{i\alpha}(n)$ as an optimum criteria.

To summarize, the invention provides separated estimation of multiple motion parameters and takes an X-ray angiogram image that reflects different kinds of motion signals such as a translational motion signal, a cardiac motion signal, a respiratory motion signal, a high-frequency motion signal and so on into account, all motions that are separated are more accurate over the prior art, which provides accurate and effective help for medical diagnosis.

BRIEF DESCRIPTION OF THE DRAWINGS

In FIGS. 4A, 4B, 4C, 4D, 4E, 4F, 4G, 4H, 4I, 4J, 4K, 4L, 4M, and 4N, a horizontal ordinate 'image frame' indicates "the number of image frames", and a vertical ordinate 'displacement/mm' indicates 'motion displacement/mm'.

DETAILED DESCRIPTION OF THE EMBODIMENTS

Figure 1:
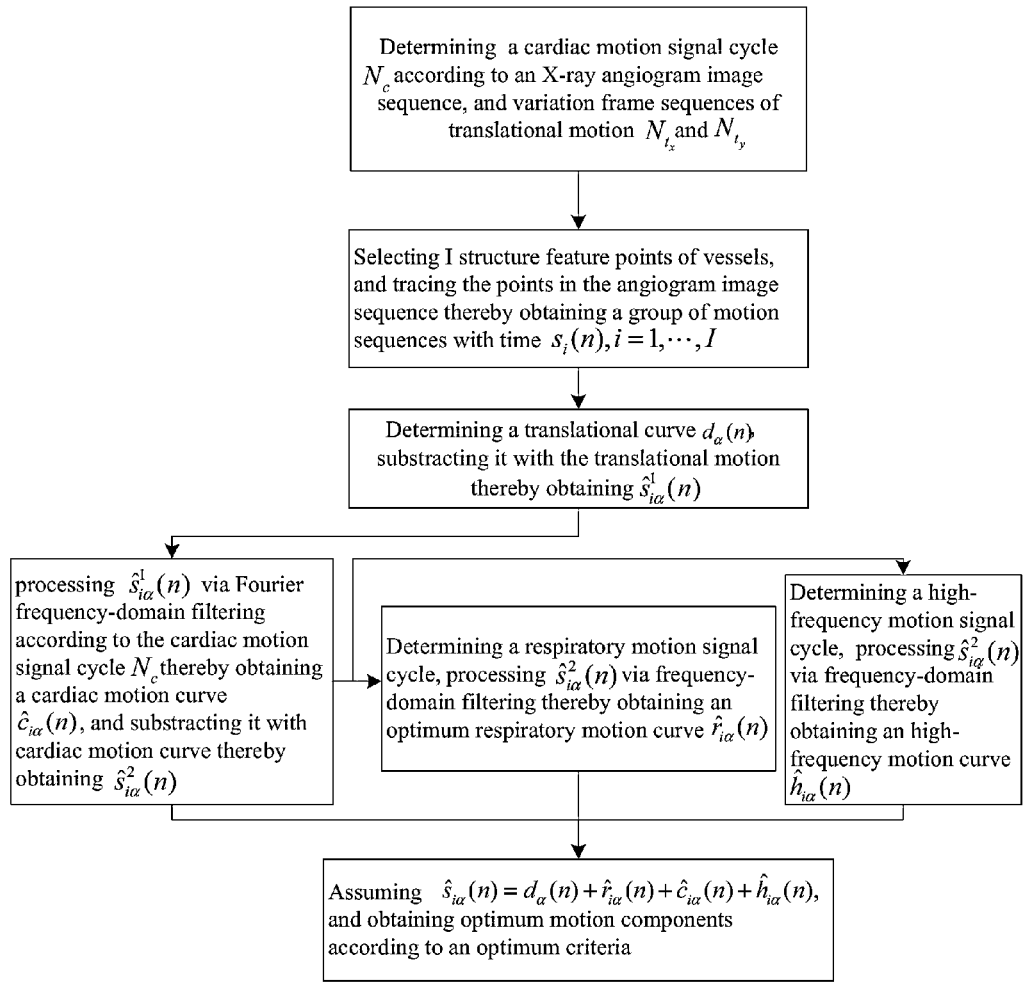
FIG. 1 is a flowchart of a method for separating and estimating multiple motion parameters in an X-ray angiogram image according to an exemplary embodiment of the invention.

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Specifically, the invention relates to a data separation method that integrates selection of structure feature points of vessels and Fourier series expansion, and is capable of solving a problem of separating motion signals of human bodies, such as a translational motion signal, a cardiac motion signal, a respiratory motion signal and so on.

An objective of the invention is to provide a method for separating and estimating multiple motion parameters in an X-ray angiogram image that is based on frequency-domain filtering and multivariable optimization and capable of accurately separating all motion parameters in a simple, fast and undamaged manner, and can be widely applied to single-arm angiogram and dual-arm angiogram.

An X-ray angiogram image records a projection of cardiac motion on a coronary, and superposition of two-dimensional motion of coronary on a angiography plane caused by respiratory motion of a human body, and two-dimensional translational motion of the patient.

The invention integrates the Fourier series expansion and multivariable optimization for separating a translational signal, a cardiac signal, and a respiratory motion signal, and comprises the following steps:

1. Tracing structure feature points of vessels in an X-ray angiogram image sequence thereby obtaining a tracing curve $s_i(n)$, $i=1, \ldots, I$, $n=1, \ldots, N$, where I represents the number of the feature points, and N represents the number of image frames in the X-ray angiogram image sequence. It is required that the structure feature points of vessels can really and comprehensively reflect motion information of the vessels, and thus based on teaching of physiology and anatomy, feature points that are selected are bifurcation points of vessels. To obtain the structure feature points of vessels, the X-ray angiogram image needs to be preprocessed, segmented and thinned thereby generating a vascular skeleton, and then the structure feature points of vessels are selected via the vascular skeleton. A tracing method of the invention obtains a coordinate of each feature point at each frame by establishing a relationship for each bifurcation point of different frames in a skeleton sequence of the X-ray angiogram image.

2. Assuming a variation frame sequence of translational motion $\{N_t, t=1, \ldots, T\}$, and a slope angle sequence $\{\alpha_t, t=1, \ldots, T-1\}$ of translational motion, where T represents the number of variations in motion directions; then a simulated translation curve $d_\alpha(n)$ can be obtained according to the following formula:

$$d_\alpha(n) = \begin{cases} 0 & n \in (0, N_1] \\ \tan(\alpha_1)(n - N_1) & n \in (N_1, N_2] \\ d_\alpha(N_1) + \tan(\alpha_2)(n - N_2) & n \in (N_2, N_3] \\ \ldots \\ d_\alpha(N_{T-2}) + \tan(\alpha_{T-1})(n - N_{T-1}) & n \in (N_{T-1}, N_T] \\ d_\alpha(N_T) & n \in (N_T, N] \end{cases}$$

It is possible to determine an X-axis variation frame sequence of translational motion $\{N_{t_x}, t_x=1, \ldots, T_x\}$ via the angiogram image, where $T_x$ represents the number of variations in an X-axis motion direction, and an X-axis simulated translation curve $d_{\alpha_x}(n)$ at a range of $(-\pi/2, \pi/2)$ of the slope angle sequence $\{\alpha_t, t=1, \ldots, T-1\}$. Also, it is possible to determine a Y-axis variation frame sequence of translational motion $\{N_{t_y}, t_y=1, \ldots, T_y\}$ via the angiogram image, where $T_y$ represents the number of variations in a Y-axis motion direction, and a Y-axis simulated translation curve $d_{\alpha_y}(n)$ at a range of $(-\pi/2, \pi/2)$ of the slope angle sequence $\{\alpha_{t_y}, t_y=1, \ldots, T_y-1\}$. $d_\alpha(n) = (d_{\alpha_x}(n), d_{\alpha_y}(n))$ represents translational motion of a patient.

3. Determining a cardiac motion signal cycle $N_c$ according to the X-ray angiogram image sequence, obtaining a multi-motion synthetic motion curve $\hat{s}_{i\alpha}^1(n) = s_i(n) - d_\alpha(n)$ without translational motion, and processing the synthetic motion curve $\hat{s}_{i\alpha}^1(n)$ via Fourier frequency-domain filtering according to the cardiac motion signal cycle $N_c$ thereby obtaining a cardiac motion curve $\hat{c}_{i\alpha}(n)$;

4. Obtaining a residual component $\hat{s}_{i\alpha}^2(n)$ with no translational motion signal or cardiac motion signal, processing each respiratory motion signal $\hat{s}_{i\alpha}^2(n)$ via Fourier frequency-domain filtering according to each respiratory motion signal cycle in a cycle range of $N_{\alpha_r} = m_c N_c$, $m_c \in [3, 10]$, obtaining an optimum respiratory motion signal curve $\hat{r}_{i\alpha}(n)$ and an optimum respiratory motion signal cycle $\hat{N}_{\alpha_r}$, with respect to a current simulated translation curve using a fitting curve $\hat{r}'_{i\alpha}(n)$ closest to the residual motion curve $\hat{s}_{i\alpha}^2(n)$ as an optimum criteria;

5. Detecting whether an amplitude of a curve $\hat{h}'_{i\alpha}(n) = \hat{s}_{i\alpha}^2(n) - \hat{r}'_{i\alpha}(n)$ obtained according to the residual component $\hat{s}_{i\alpha}^2(n)$ and the fitting curve $\hat{r}'_{i\alpha}(n)$ is less than three pixels, determining there is no high-frequency component if yes, otherwise processing each high-frequency component motion cycle $\hat{s}_{i\alpha}(n)$ via Fourier frequency-domain filtering according to each high-frequency motion signal cycle in a cycle range of $N_{\alpha h}=m_h N_c$, $m_h \in [1/7, 5/7]$, thereby obtaining an optimum high-frequency motion signal curve $\hat{h}_{i\alpha}(n)$ and an optimum high-frequency motion signal cycle $\hat{N}_{\alpha h}$ with respect to a current translation curve using a fitting curve $\hat{h}'_{i\alpha}(n)$ closest to the high-frequency motion curve as an optimum criteria;

6. Obtaining a synthetic motion estimation curve $\hat{s}_{i\alpha}(n)=\hat{d}_\alpha(n)+\hat{r}_{i\alpha}(n)+\hat{c}_{i\alpha}(n)+(n)+\hat{h}_{i\alpha}(n)$ $i \in [1, I]$, and obtaining an optimum translational motion curve, a cardiac motion curve, a respiratory motion curve, and a high-frequency motion curve using a tracing curve $s_i(n)$ closest to the synthetic motion estimation curve $\hat{s}_{i\alpha}(n)$ as an optimum criteria.

The method of the invention takes into account that an appropriate feature point (such as an intersection point between ribs) might not be found in every angiogram image under a condition of X-ray angiogram, and integrates selection of structure feature points of vessels, Fourier frequency-domain filtering, and multivariable optimization for extracting multiple motion parameters, and thus the invention features wider applicability and flexibility over a traditional method that uses manual tracing to obtain respiratory motion or translational motion, and can be applied to almost all angiogram image sequences. Meanwhile, in comparison with a conventional method that sets labeling points in the vicinity of a heart and then traces the points via an imaging method, which may cause damage to a patient's health since labeling objects in a body thereof is invasive, and may bring inevitable trouble and errors in practice due to a fact that adding, imaging, and removal of the objects and extraction of respiratory motion are very complex, the method of the invention features higher safety and feasibility.

The invention will be described hereinafter in conjunction with accompanying drawings and examples.

The invention provides a method for directly extracting multiple motion parameters such as a translational motion signal, a respiratory motion signal, and a cardiac motion signal from an X-ray angiogram image sequence, the methods selects some feature points on coronary vessels and traces the points thereby obtaining a motion curve thereof with time, then obtains signals, like a translational signal, a cardiac signal, a respiratory motion signal and so on, by separating the motion curve via Fourier series expansion, frequency-domain filtering, and multivariable optimization. The invention features good clinical applicability.

Normal cardiac motion measured in clinical practice is 60 to 100 times per minute, and a cycle thereof is 0.6 to 1.0 s. Periodic motion having a frequency higher than 140 times per second and a cycle thereof less than 0.42 s is diagnosed as pathologically abnormal motion. If it is able to detect a frequency of high-frequency motion is higher than that of normal cardiac motion by analyzing the coronary angiogram image, and an amplitude of a high-frequency signal is greater than 2 to 3 pixels, it can be reasonably deduced that the high-frequency signal is somewhat a useful signal (or a disease diagnosis signal). The reason for this is, some errors (normally not greater than three pixels) may occur during procession of the coronary angiogram image due to inaccuracy of segmentation or skeleton extraction. Therefore, as it is detected that the high-frequency motion exists and amplitude thereof is greater than three pixels, a new and useful disease diagnosis signal can be provided for a doctor. A frequency of the respiratory motion signal is far less than that of each of those two kinds of motion referred above, normally 3 to 6 s, and may be much higher in a quiet condition.

The invention separates motion components (comprising the translational signal, the cardiac motion signal, the respiratory motion signal, high-frequency motion signal and so on) in the angiogram image by integrating Fourier series expansion with frequency-domain filtering based on features thereof as follows.

Next discrete Fourier series transformation will be introduced hereinafter.

1) Basis of Discrete Fourier Series Transformation

According to principle of Fourier series expansion, continuous temporal periodic signals can be expressed by Fourier series. Correspondingly, a periodic sequence can also be expressed by discrete Fourier series. If a cycle of a periodic sequence $x_p(n)$ is $N_p$, then $$x_p(n)=x_p(n+rN_p) \qquad (1)$$

where r can be any integer,

Then Fourier series transformation is conducted on $x_p(n)$ according to the following formulae (2) and (3):

$$X_p(k) = \sum_{n=0}^{N_p-1} x_p(n) \cdot e^{-j\left(\frac{2\pi}{N_p}\right)nk} \qquad (2)$$

$$x_p(n) = \frac{1}{N_p}\sum_{k=0}^{N_p-1} X_p(k) \cdot e^{j\left(\frac{2\pi}{N_p}\right)nk} \qquad (3)$$

In formula (3), $$e^{j\left(\frac{2\pi}{N}\right)n}$$

represents a fundamental frequency component of the periodic sequence, $$e^{j\left(\frac{2\pi}{N}\right)nk}$$

represents a $k^{th}$ harmonic component, and $X_p(k)$ represents a harmonic coefficient. Since $$e^{j\left(\frac{2\pi}{N}\right)n(k+N)} = e^{j\left(\frac{2\pi}{N}\right)nk},$$

the number of independent harmonic components is $N_p$, the number of terms in sum of the Fourier series is $k=0, \ldots, N_p-1$. Formula (2) is a summation formula that determines the coefficient $X_p(k)$ by $x_p(n)$.

2) Separation Algorithm

Assuming in an angiogram image sequence, a motion curve of an $i^{th}$ feature point $P_i(x, y)$ on a coronary vessel along an X-axis is $x_i(n)$ (where n represents the number of angiography frames that are discrete in time, and N represents a length of the sequence), a motion curve along a Y-axis is $y_i(n)$, and $s_i(n)=(x_i(n), y_i(n))$, then $s_i(n)$ can be expressed as follows:

$$s_i(n)=d_i(n)+r_i(n)+c_i(n)+h_i(n)+t_i(n) i \in [1,I] \qquad (4)$$

where I represents the number of feature points, $d(n)=(x_d(n), y_d(n))$ represents rigid translational motion of a patient that varies with time, $r_i(n)=(x_{ri}(n), y_{ri}(n))$ represents motion caused by respiratory motion, $c_i(n)=(x_{ci}(n), y_{ci}(n))$ represents motion of each point on the vessel caused by cardiac motion, $h_i(n)=(x_{hi}(n), y_{hi}(n))$ represents motion caused by possible high-frequency motion of the patient, and $t_i(n)=(x_{ti}(n), y_{ti}(n))$ represents other noise components caused by vessel segmentation or thinning. For the purpose of easy explanation, $s_i(n)$ represents a coordinate variation curve of extracted feature points on a vessel along both the X-axis and the Y-axis, $d(n)$, $r_i(n)$, $c_i(n)$, $h_i(n)$ and $t_i(n)$ respectively represents a coordinate variation curve of a translational motion signal, a respiratory motion signal, a cardiac motion signal, a high-frequency motion signal, and a noise component along the X-axis and the Y-axis in the content hereinafter.

Assuming a cardiac motion signal cycle is $N_c$, a respiratory motion signal cycle is $N_r$, a high-frequency motion signal cycle is $N_h$, then according to formula (3), $c(n)$ $r(n)$ and $h(n)$ are:

$$c(n) = \frac{1}{N_c} \sum_{k=0}^{N_c-1} C(k) \cdot e^{j\left(\frac{2\pi}{N_c}\right)nk} \quad (5)$$

$$r(n) = \frac{1}{N_r} \sum_{k=0}^{N_r-1} R(k) \cdot e^{j\left(\frac{2\pi}{N_r}\right)nk}$$

$$h(n) = \frac{1}{N_h} \sum_{k=0}^{N_h-1} H(k) \cdot e^{j\left(\frac{2\pi}{N_h}\right)nk}$$

where $$e^{j\left(\frac{2\pi}{N_c}\right)nk}$$

represents a harmonic component of the cardiac motion signal, $$e^{j\left(\frac{2\pi}{N_r}\right)nk}$$

represents a harmonic component of the respiratory motion signal, $$e^{j\left(\frac{2\pi}{N_h}\right)nk}$$

represents a harmonic component of the high-frequency motion signal, $C(k)$, $R(k)$ and $H(k)$ respectively represents a harmonic coefficient of $c(n)$, $r(n)$ and $h(n)$. To completely separate $c(n)$, $r(n)$, and $h(n)$, harmonic components thereof cannot be overlapped to each other (assuming the translational motion $d(n)$ is already eliminated), namely:

$$\forall k_1(n_1) = 1, \ldots, N_c - 1, k_2(n_2) = 1, \quad (6)$$
$$\ldots, N_r - 1, k_3(n_3) = 1, \ldots, N_h - 1$$
$$\exists \left(\frac{2\pi}{N_c}\right)n_1k_1 \neq \left(\frac{2\pi}{N_r}\right)n_2k_2 \neq \left(\frac{2\pi}{N_h}\right)n_3k_3$$

where $n_1$, $n_2$ and $n_3$ are time-domain independent variables, and $k_1$, $k_2$ and $k_3$ are frequency-domain independent variables.

To satisfy formula (6), it is required that $N_c$, $N_r$ and $N_h$ are coprime. In addition, to separate $c(n)$, $r(n)$ and $h(n)$, a length of $s(n)$ should be greater than or equal to a cycle of $s(n)$, namely being greater than $N_c \cdot N_r \cdot N_h$.

However, the above two requirements are very difficult to be met: even if $N_c$, $N_r$ and $N_h$ are coprime, it is almost impossible to meet the second requirement. The reason for this is that time contrast agent staying in a human body is not long enough (not greater than 10 seconds, and normally 6 seconds for an angiogram image sequence), assuming a frame rate is 80 ms/frame (or even less), then $N_c \approx 10$, $N_r > 30$, $N_c \cdot N_r \cdot N_h > N_c \cdot N_r > 300 > 10/0.08$, and it is difficult to obtain a complete cyclic sequence. Moreover, in terms of a translational motion curve, a requirement for determining the respiratory motion signal cycle is comparatively high.

Although it is impossible to perfectly separate the cardiac motion curve, the respiratory motion curve, the high-frequency motion curve and the translational motion curve, it is feasible to approximately separate them via Fourier series expansion, frequency-domain filtering, and multivariable optimization.

The separation algorithm is based on the following assumption:

(1) assuming a cycle is $N_a$, as a length of a sequence is an integer multiple of the cycle and is not an integer multiple of other motion signal cycles, a component of motion only exists at the frequency $$e^{j\left(\frac{2\pi}{N_a}\right)nk},$$

which is proven by formula (3), and other components of motion are smooth at the frequency $$e^{j\left(\frac{2\pi}{N_a}\right)nk}.$$

This assumption is feasible since the respiratory motion signal, the cardiac motion signal and the high-frequency motion signal are smooth, and it is almost impossible for any one of them to become a fundamental frequency component of the other.

(2) since the translational motion signal is non-periodic rigid motion varies with time, it is estimated and assumed that the translational motion signal is in poly-line motion expressed as follows:

$$d_\alpha(n) = \begin{cases} 0 & n \in (0, N_1] \\ \tan(\alpha_1)(n - N_1) & n \in (N_1, N_2] \\ d_\alpha(N_1) + \tan(\alpha_2)(n - N_2) & n \in (N_2, N_3] \\ \ldots \\ d_\alpha(N_{T-2}) + \tan(\alpha_{T-1})(n - N_{T-1}) & n \in (N_{T-1}, N_T] \\ d_\alpha(N_T) & n \in (N_T, N] \end{cases} \quad (7)$$

where $\{N_t, t=1, \ldots, T\}$ represents a variation frame of the translational motion signal, $\{\alpha_t, t=1, \ldots, T-1\}$ represents a slope angle of the translational motion signal, T represents the number of variations in motion directions.

Figure 2A:
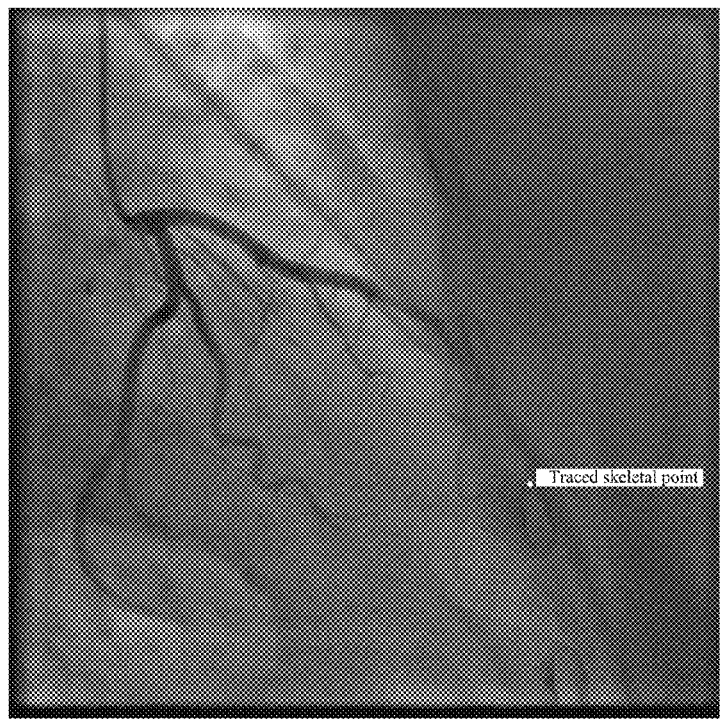
FIG. 2A illustrates labeling of an angiogram image and a skeletal point during Fourier transformation, where a corresponding projection angle is (−26.5°, −20.9°)
Figure 2B:
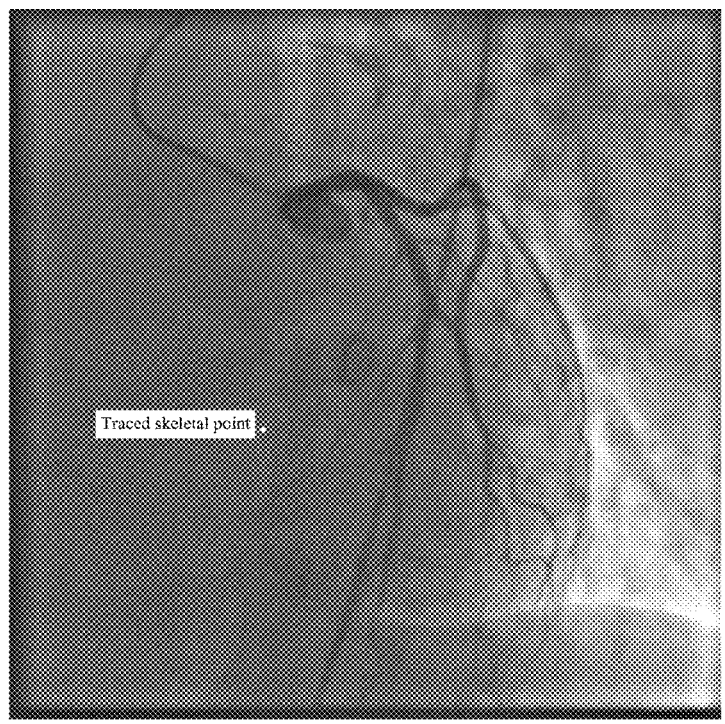
FIG. 2B illustrates labeling of an angiogram image and a skeletal point during Fourier transformation, where a corresponding projection angle is (42.3°, 26.8°)

FIG. 1 is an overall flowchart of the invention, and the algorithm comprises the following steps:

Step 1: tracing structure feature points of vessels in an X-ray angiogram image sequence thereby obtaining a tracing curve $s_i(n)$, $i=1, \ldots, I$, $n=1, \ldots, N$, where I represents the number of the feature points, and N represents the number of image frames in the X-ray angiogram image sequence. It is required that the structure feature points of vessels can really and comprehensively reflect motion information of the vessels, and thus based on teaching of physiology and anatomy, feature points that are selected are bifurcation points of vessels. As shown in FIGS. 2A and 2B, in a pair of angiogram images with projection angles of (−26.5°, −20.9°) and (42.3°, 26.8°), there are five numbered feature points (labeled points in FIGS. 3A and 3B). To obtain the structure feature points of vessels, the X-ray angiogram image needs to be preprocessed, segmented and thinned thereby generating a vascular skeleton, and then the structure feature points of vessels are selected via the vascular skeleton. A tracing method of the invention obtains a coordinate of each feature point at each frame by establishing a relationship for each bifurcation point of different frames in a skeleton sequence of the X-ray angiogram image.

Ideally, $s_i(n)$ can be expressed as:

$$s_i(n) \approx d(n) + r_i(n) + c_i(n) + h_i(n) \; i \in [1, I] \quad (8)$$

Step 2: Estimation of a Translational Motion Curve:

If translational motion of a patient exists, it is possible to determine an X-axis variation frame sequence of translational motion $\{N_{t_x}, t_x=1, \ldots, T_x\}$ via the angiogram image, where $T_x$ represents the number of variations in an X-axis motion direction, and a Y-axis variation frame sequence of translational motion $\{N_{t_y}, t_y=1, \ldots, T_y\}$ via the angiogram image, where $T_y$ represents the number of variations in a Y-axis motion direction. Moreover, it is possible to determine an X-axis simulated translation curve $d_{\alpha_x}(n)$ at a range of $(-\pi/2, \pi/2)$ of the slope angle sequence, and a Y-axis simulated translation curve $d_{\alpha_y}(n)$ at a range of $(-\pi/2, \pi/2)$ of the slope angle sequence $\{\alpha_{t_y}, t_y=1, \ldots, T_y-1\}$. $d_\alpha(n) = (d_{\alpha_x}(n), d_{\alpha_y}(n))$ represents translational motion of a patient.

A multi-motion synthetic motion curve without translational motion is represented by $\hat{s}_{i\alpha}^1(n) = s_i(n) - d_\alpha(n)$.

Step 3: Estimation of the Cardiac Motion Curve:

A cardiac motion signal cycle $N_c$ is determined according to the angiogram image sequence. Normally $N_c \approx 0.8/f$, where $N_c$ represents the number of angiogram image frames in a cardiac cycle, 0.8 represents time of the cardiac cycle (in second), and f represents a frame rate, namely the number of angiogram images that are taken per second. By choosing a sequence $\hat{s}_{i\alpha}^{11}(n)$ having a length of $n_{sc}$ from $\hat{s}_{i\alpha}^1(n)$, where $n_{sc}$ is an integer multiple of $N_c$, $\hat{s}_{i\alpha}^{11}(n)$ is divided into a motion curve along the X-axis $x_{ic}(n)$, and a motion curve along the Y-axis $y_{ic}(n)$, then discrete Fourier expansion is conducted thereon thereby obtaining harmonic coefficients $X_{ic}(k)$ and $Y_{ic}(k)$, $k=0, \ldots, n_{sc}-1$;

A frequency-domain response of a residual motion curve without the translational motion signal and the cardiac motion signal is:

$$\hat{S}_{i\alpha}^{2x}(k) = \begin{cases} X_i(k), & \left(k \neq \frac{n_{sc}}{N_c} l, l=1, \ldots, N_c-1\right) \\ (X_i(k) + X_i(k+1))/2, & \left(k = \frac{n_{sc}}{N_c} l, l=1, \ldots, N_c-1\right) \end{cases} \quad (9)$$

A frequency-domain response of the cardiac motion is:

$$C_{i\alpha}^x(k) = X_i(k) - \hat{S}_{i\alpha}^x(k) \; (k=1, \ldots, n_{sc}-1)$$

Discrete Fourier inverse transformation is conducted on $C_{i\alpha}^x(k)$ thereby obtaining an X-axis cardiac motion curve $\hat{c}_{i\alpha}^x(n)$, then $\hat{c}_{i\alpha}^y(n)$, and finally a cardiac motion curve $\hat{c}_{i\alpha}(n)$.

Then discrete Fourier inverse transformation is conducted on the residual motion curve without the translational motion signal and the cardiac motion signal, thereby obtaining $\hat{s}_{i\alpha}^2(n)$.

Step 4: Estimation of a Respiratory Motion Curve

For the respiratory motion signal cycle $N_{\alpha r} = m_c N_c$, $m_c \in [3, 10]$, as a length of an original motion signal is greater than the respiratory motion signal cycle $N_{\alpha r}$, Fourier frequency-domain filtering is conducted on $\hat{s}_{i\alpha}^2$, (n) via the method of separating the cardiac motion signal thereby obtaining a respiratory motion curve $r_{i\alpha N_{\alpha r}}(n)$; as the respiratory motion signal cycle is greater than length of the original motion signal, it is determined there it does not contain a respiratory motion signal cycle, and the following steps are taken to separate the respiratory motion signal:

a. selecting a sequence $\hat{s}_{iN_{\alpha j}}^{21}(n)$, $j=1, \ldots, n_{sc}-N_{\alpha r}/2+1$ with a length of $N_{\alpha r}/2$ from the $j^{th}$ point of the sequence $\hat{s}_{i\alpha}^2(n)$, conducting Fourier series expansion thereon thereby obtaining harmonic coefficients $\hat{S}_{iN_{\alpha j}}^{21}(k)$, $k=0, \ldots, N_{\alpha r}-1$.

b. processing a curve having a length half than that of the respiratory periodic signal (the curve comprising a motion curve with a cycle of $N_{\alpha r}/2$, and only has components at a frequency of $$e^{j\left(\frac{2\pi}{N_{\alpha r}/2}\right)nk}$$

via Fourier frequency-domain filtering thereby obtaining a motion curve $r_{i\alpha N_{\alpha j}}(n)$, $j=1, \ldots, n_{sc}-N_{\alpha r}/2+1$;

c. averaging the $r_{i\alpha N_{\alpha j}}(n)$, $j=1, \ldots, n_{sc}-N_{\alpha r}/2+1$ thereby obtaining an approximate respiratory motion curve $r_{i\alpha N_{\alpha r}}(n)$.

Then $\hat{s}_{i\alpha}^2(n)$ is processed via curve fitting thereby obtaining an estimation curve $\hat{r}'_{i\alpha}(n)$ of the respiratory motion signal (since a cycle of the respiratory motion signal is the largest and far greater than that of the high-frequency motion signal, the curve is an approximate shape of the respiratory motion signal). The following formula (10) is used to obtain an optimum respiratory motion signal cycle $\hat{N}_{\alpha r}$ and an optimum respiratory motion curve $\hat{r}_{i\alpha}(n)$ for an optimum criteria.

$$e_{\alpha r} = \min_{N_{\alpha r} \in [3N_c, 10N_c]} \left\{ \max_{i=1 \ldots I} \sum_{n=1}^{N} [r_{i\alpha N_{\alpha r}}(n) - \hat{r}'_{i\alpha}(n)]^2 \right\} \quad (10)$$

Step 5: Estimation of a High-Frequency Motion Curve

For a curve $\hat{h}'_{i\alpha}(n)$ obtained by subtracting the curve $\hat{r}'_{i\alpha}(n)$ with the residual component $\hat{s}_{i\alpha}^2(n)$, namely $\hat{h}'_{i\alpha}(n) = \hat{s}_{i\alpha}^2(n) - \hat{r}'_{i\alpha}(n)$, if an amplitude of $\hat{h}'_{i\alpha}(n)$ is not greater than 3 pixels, it is determined there is no high-frequency component (this is because that some errors that normally are not greater than three pixels may occur during procession of the coronary angiogram image due to inaccuracy of segmentation or skeleton extraction), otherwise $\hat{s}_{i\alpha}^2(n)$ is processed via Fourier frequency-domain filtering (which is identical to the cardiac motion signal) according to each high-frequency motion signal cycle in a cycle range of $N_{\alpha h} = m_h N_c$, $m_h \in [1/7, 5/7]$, thereby obtaining a corresponding high-frequency motion curve $h_{i\alpha N_{\alpha r}}(n)$.

The following formula (11) is used to obtain an optimum high-frequency motion signal cycle $\hat{N}_{\alpha h}$ and an optimum high-frequency motion curve $\hat{h}_{i\alpha}(n)$ according to the optimum criteria:

$$e_{ah} = \min_{N_{ah} \in [1/7N_c, 5/7N_c]} \left\{ \max_{i=1...I} \sum_{n=1}^{N} \left[ h_{iaN_{ah}}(n) - \hat{h}'_{ia}(n) \right]^2 \right\} \quad (11)$$

Step 6: Obtaining a Synthetic Motion Estimation Curve:
$\hat{s}_{i\alpha}(n) = d_\alpha(n) + \hat{r}_{i\alpha}(n) + \hat{c}_{i\alpha}(n) + \hat{h}_{i\alpha}(n)$ i∈[1, I], and using the following formula (12) to obtain an optimum translational motion curve $\hat{d}(n)$, a cardiac motion curve $\hat{c}_i(n)$, a respiratory motion curve $\hat{r}_i(n)$, and a high-frequency motion curve $\hat{h}_i(n)$ according to the optimum criteria:

$$e = \min_{\alpha \in (-\pi/2, \pi/2)} \left\{ \max_{i=1...I} \sum_{n=1}^{N} [s_i(n) - \hat{s}_{i\alpha}(n)]^2 \right\} \quad (12)$$

Figure 3A:
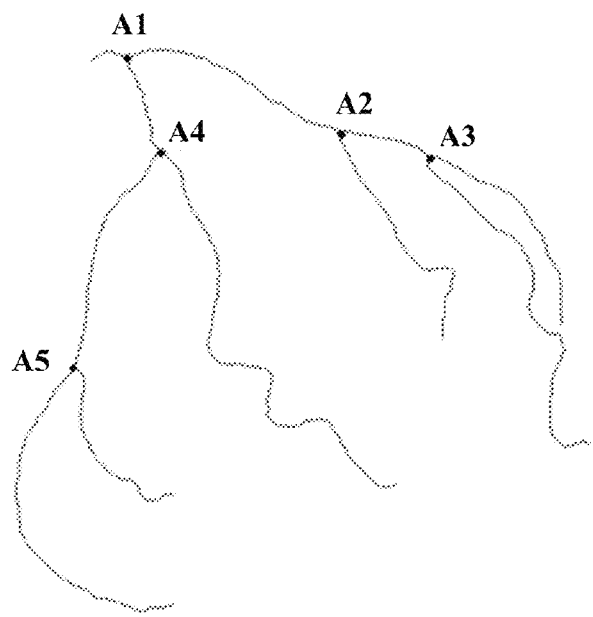
FIG. 3A illustrates a skeleton and feature point labeling of FIG. 2A.
Figure 3B:
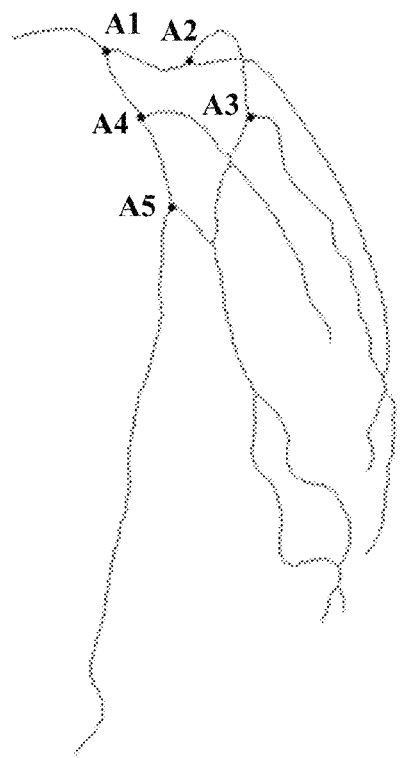
FIG. 3B illustrates a skeleton and feature point labeling of FIG. 2B.

It is determined that the cardiac motion signal cycle is 11 frames after observing the angiogram image sequence, and FIGS. 4A, 4B, 4C, 4D, 4E, 4F, 4G, 4H, 4I, 4J, 4K, 4L, 4M, and 4N illustrate results after separating motion of labeling points in FIGS. 3A and 3B.

It can be seen from FIGS. 4A, 4B, 4C, 4D, 4E, 4F, 4G, 4H, 4I, 4J, 4K, 4L, 4M, and 4N that since different feature points are located at different parts of a heart, and motion of these parts is different, an original motion curve of feature points is disordered because it is greatly affected by the respiratory motion, and motion amplitudes for different feature points are different.

Figure 4A:
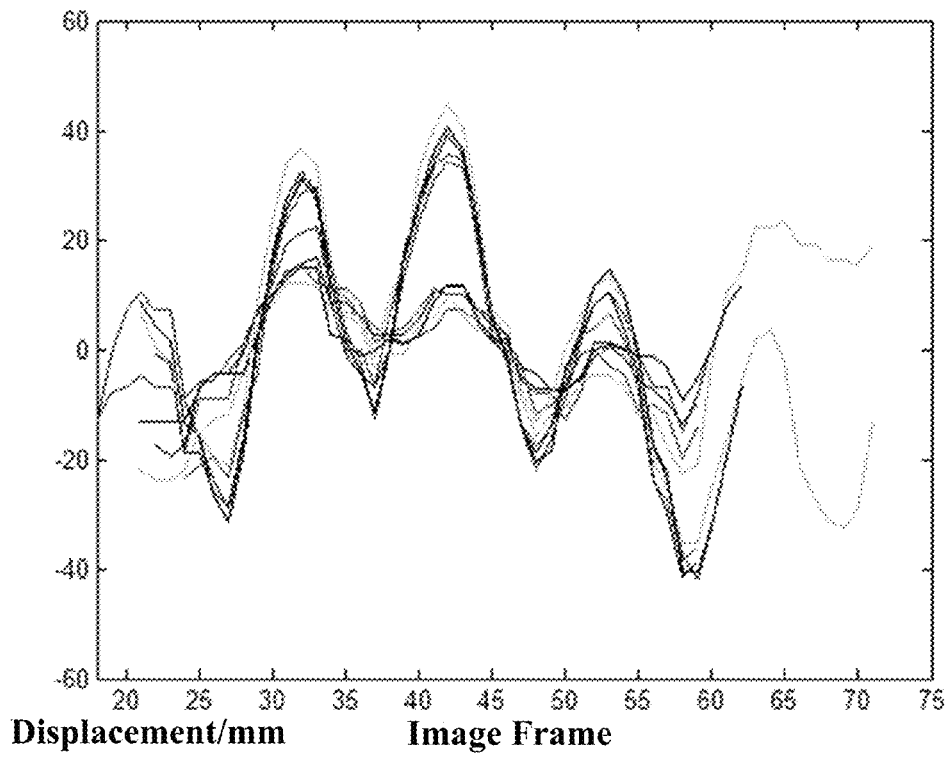
FIG. 4A is an original curve obtained by tracing all labeling points of FIG. 3A in an angiogram image sequence, where a solid line indicates variation in a horizontal ordinate (X-axis coordinate) of each feature point, and a dashed line indicates variation in a vertical ordinate (Y-axis coordinate) of each feature point.
Figure 4B:
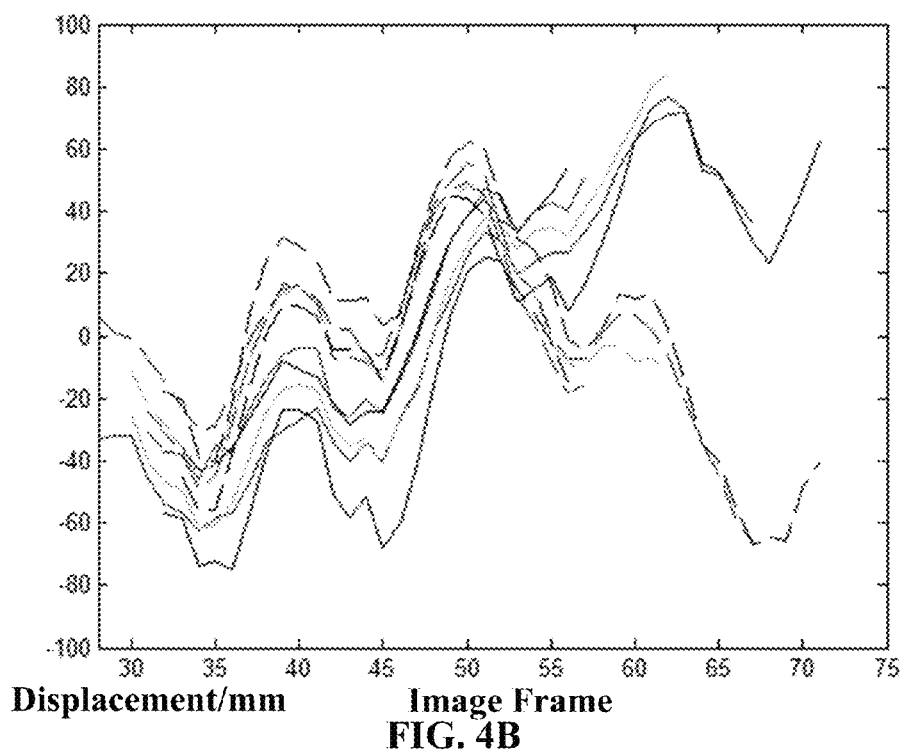
FIG. 4B is an original curve obtained by tracing all labeling points of FIG. 3B in an angiogram image sequence, where a solid line indicates variation in a horizontal ordinate (X-axis coordinate) of each feature point, and a dashed line indicates variation in a vertical ordinate (Y-axis coordinate) of each feature point.
Figure 4C:
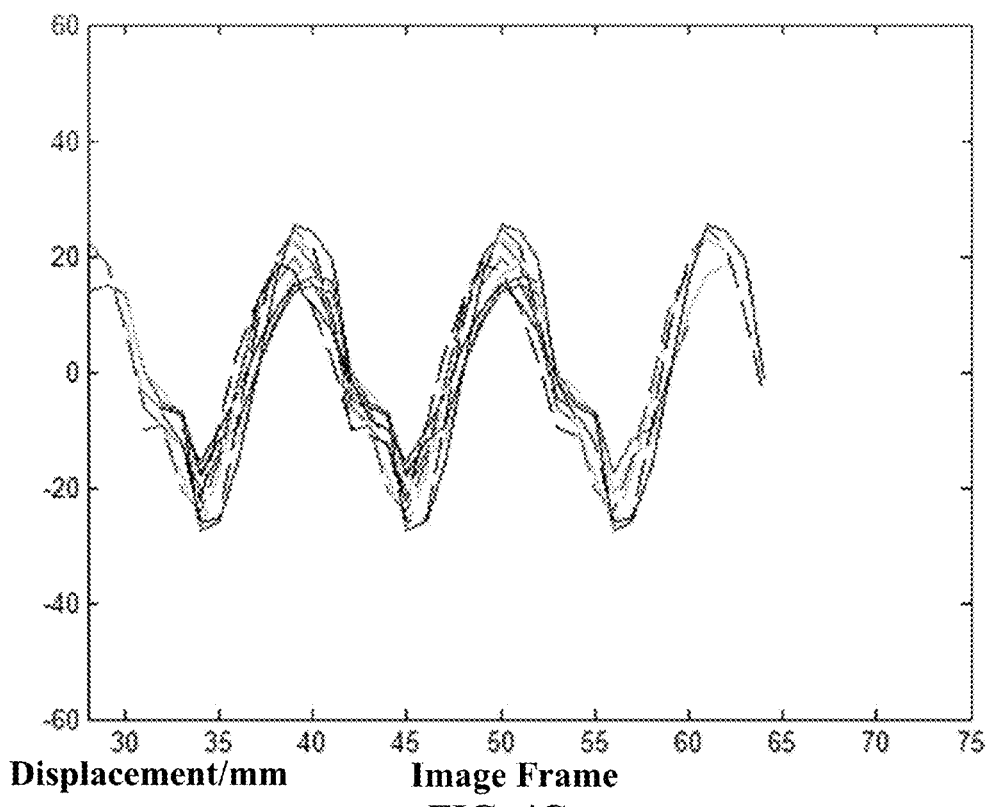
FIG. 4C is a cardiac motion curve obtained by decomposing the original curve of FIG. 3A, where a solid line indicates variation in a horizontal ordinate (X-axis coordinate) of each feature point, and a dashed line indicates variation in a vertical ordinate (Y-axis coordinate) of each feature point.
Figure 4D:
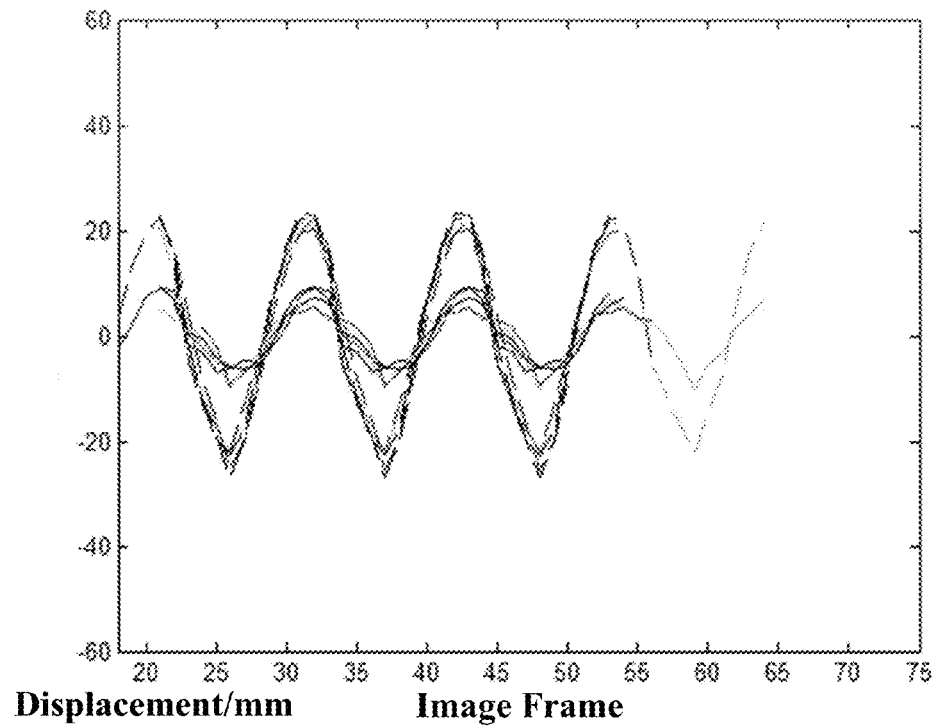
FIG. 4D is a cardiac motion curve obtained by decomposing the original curve of FIG. 3B, where a solid line indicates variation in a horizontal ordinate (X-axis coordinate) of each feature point, and a dashed line indicates variation in a vertical ordinate (Y-axis coordinate) of each feature point.
Figure 4E:
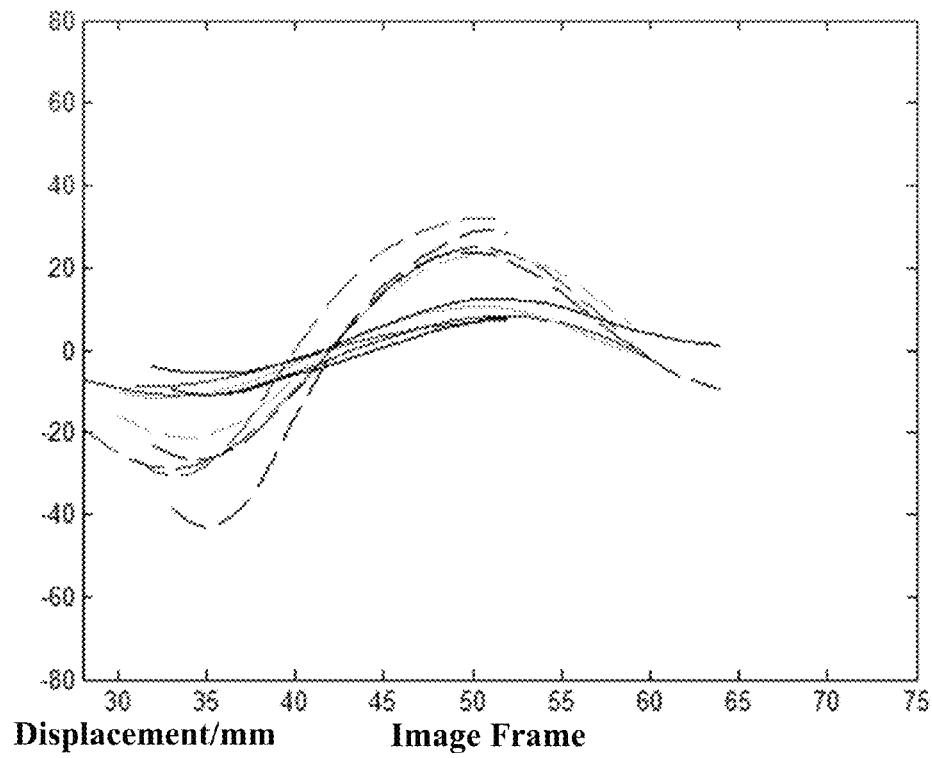
FIG. 4E is a respiratory motion curve obtained by decomposing the original curve of FIG. 3A, where a solid line indicates variation in a horizontal ordinate (X-axis coordinate) of each feature point, and a dashed line indicates variation in a vertical ordinate (Y-axis coordinate) of each feature point.
Figure 4F:
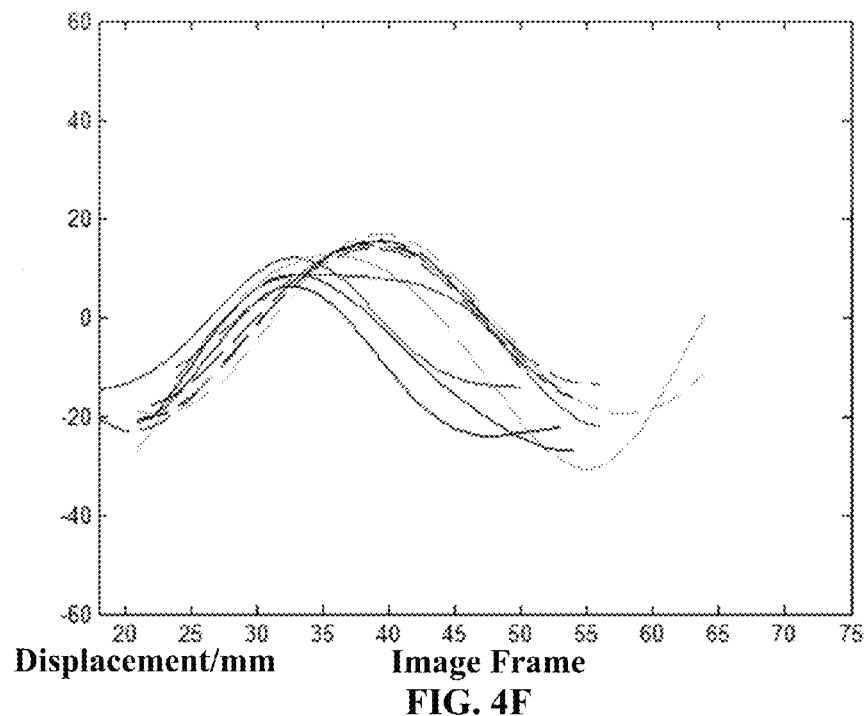
FIG. 4F is a respiratory motion curve obtained by decomposing the original curve of FIG. 3B, where a solid line indicates variation in a horizontal ordinate (X-axis coordinate) of each feature point, and a dashed line indicates variation in a vertical ordinate (Y-axis coordinate) of each feature point.
Figure 4G:
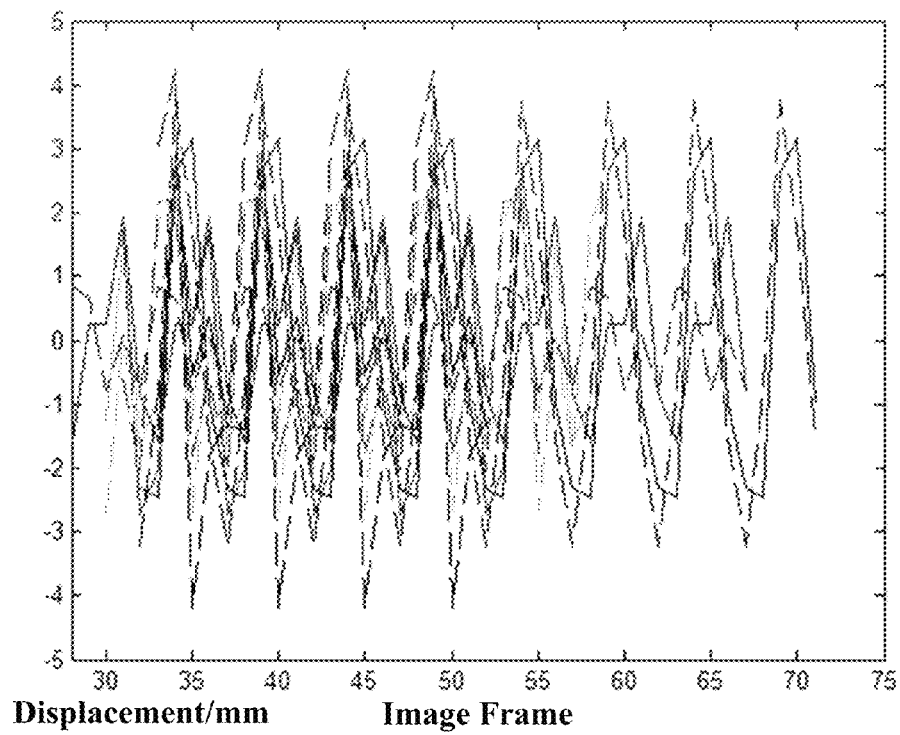
FIG. 4G is a high-frequency motion curve obtained by decomposing the original curve of FIG. 3A, where a solid line indicates variation in a horizontal ordinate (X-axis coordinate) of each feature point, and a dashed line indicates variation in a vertical ordinate (Y-axis coordinate) of each feature point.
Figure 4H:
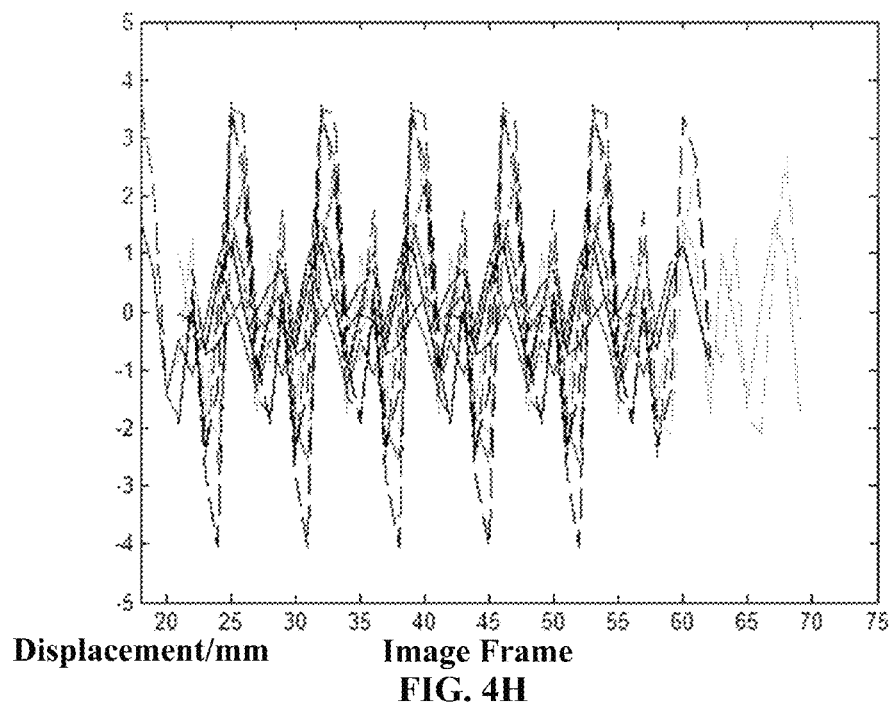
FIG. 4H is a high-frequency motion curve obtained by decomposing the original curve of FIG. 3B, where a solid line indicates variation in a horizontal ordinate (X-axis coordinate) of each feature point, and a dashed line indicates variation in a vertical ordinate (Y-axis coordinate) of each feature point.
Figure 4I:
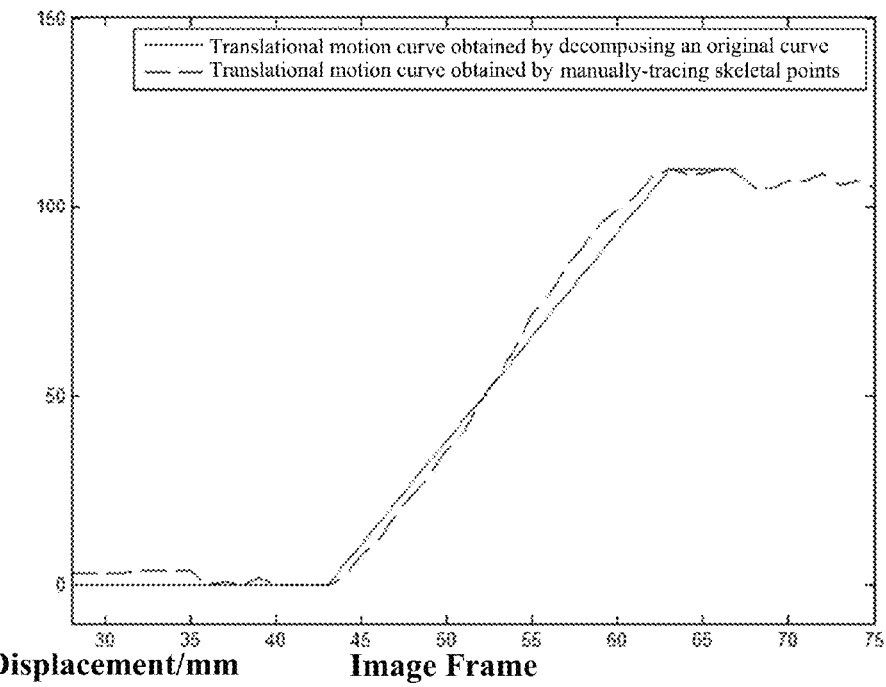
FIG. 4I illustrates comparison between an X-axis translational motion curve obtained by decomposing the original curve in FIG. 3A and an X-axis curve obtained by tracing the skeletal point in FIG. 2A, where a solid line indicates the X-axis translational motion curve obtained by decomposition, and a dashed line indicates X-axis curve obtained by tracing the skeletal point.
Figure 4J:
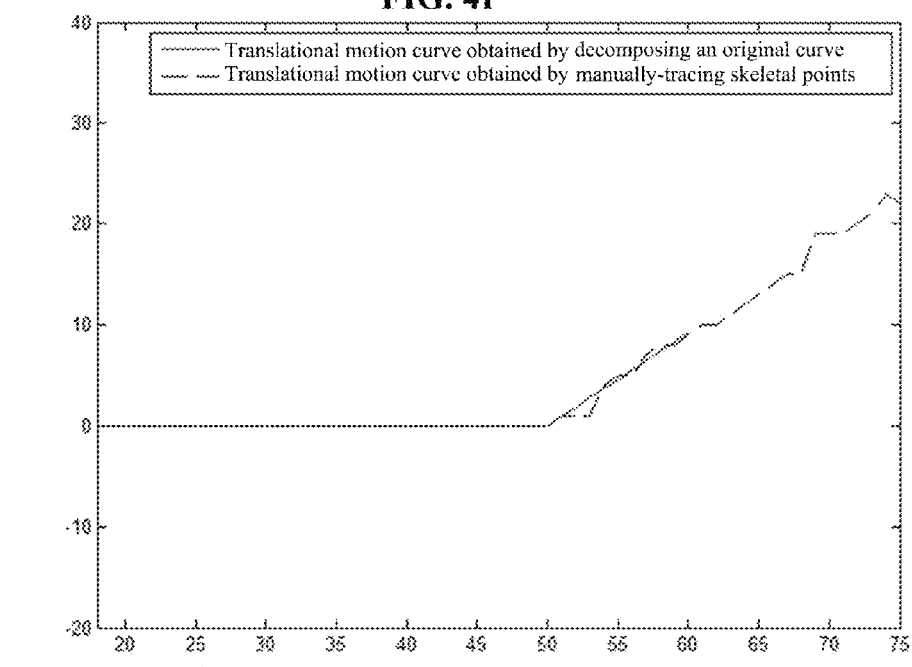
FIG. 4J illustrates comparison between an X-axis translational motion curve obtained by decomposing the original curve in FIG. 3B and an X-axis curve obtained by tracing the skeletal point in FIG. 2B, where a solid line indicates the X-axis translational motion curve obtained by decomposition, and a dashed line indicates X-axis curve obtained by tracing the skeletal point.
Figure 4K:
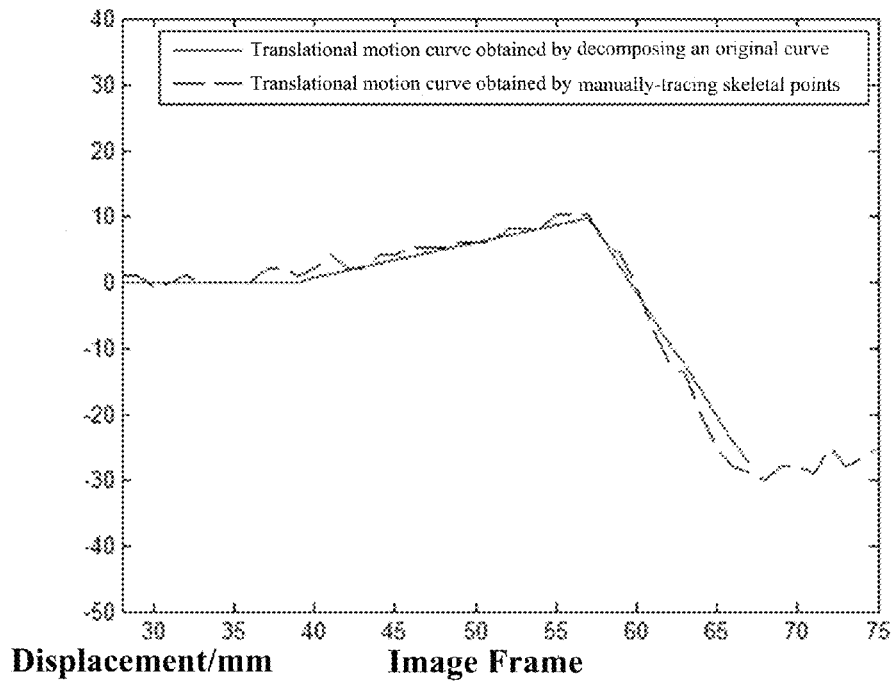
FIG. 4K illustrates comparison between a Y-axis translational motion curve obtained by decomposing the original curve in FIG. 3A and a Y-axis curve obtained by tracing the skeletal point in FIG. 2A, where a solid line indicates the Y-axis translational motion curve obtained by decomposition, and a dashed line indicates Y-axis curve obtained by tracing the skeletal point.
Figure 4L:
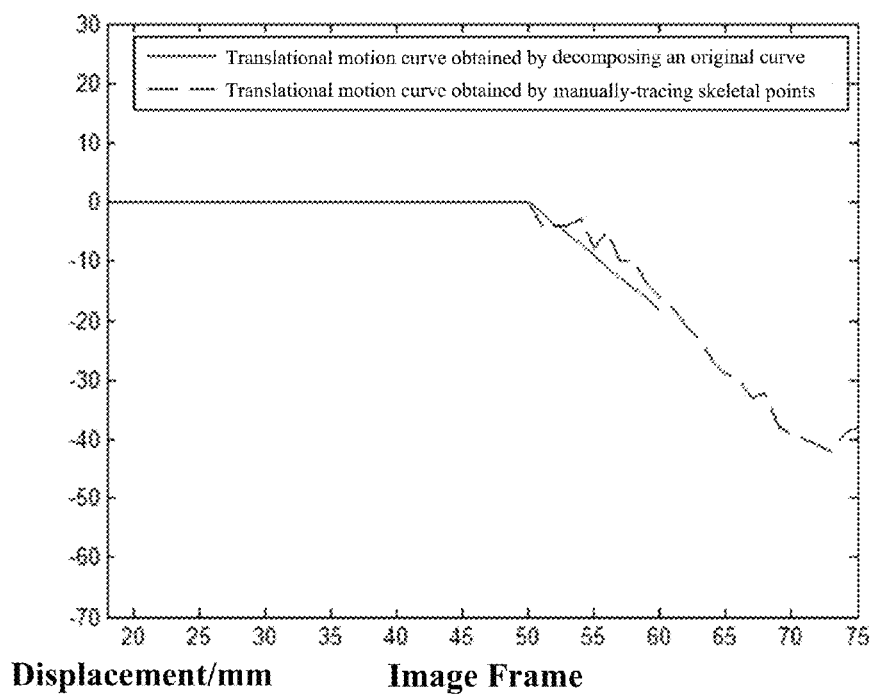
FIG. 4L illustrates comparison between a Y-axis translational motion curve obtained by decomposing the original curve in FIG. 3B and a Y-axis curve obtained by tracing the skeletal point in FIG. 2B, where a solid line indicates the Y-axis translational motion curve obtained by decomposition, and a dashed line indicates Y-axis curve obtained by tracing the skeletal point.
Figure 4M:
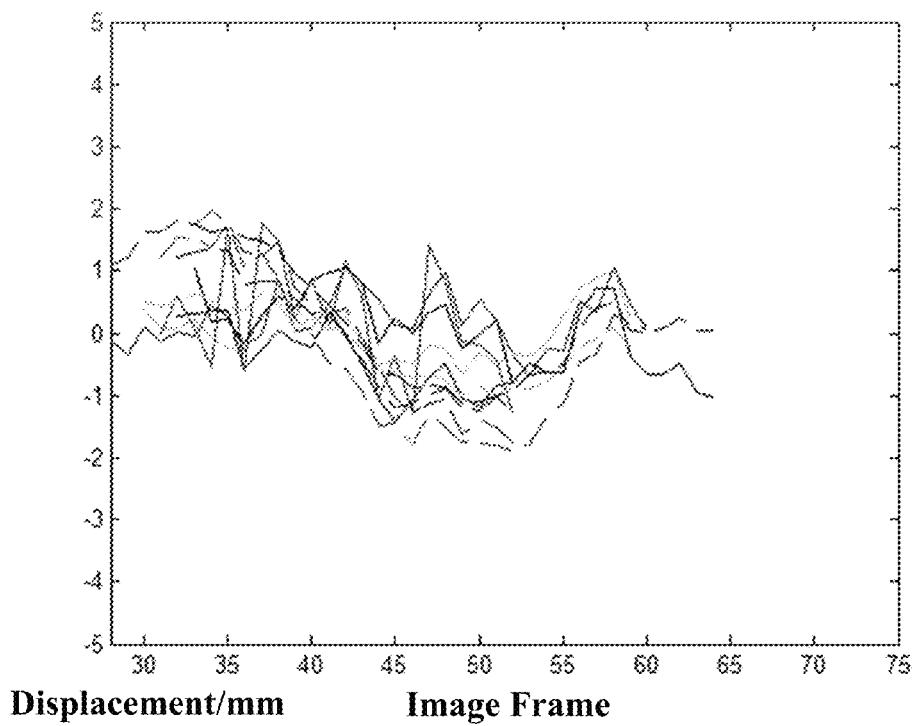
FIG. 4M illustrates a residual noise curve obtained by decomposing the original curve in FIG. 3A, where a solid line indicates variation in a horizontal ordinate (X-axis coordinate) of each feature point, and a dashed line indicates variation in a vertical ordinate (Y-axis coordinate) of each feature point.
Figure 4N:
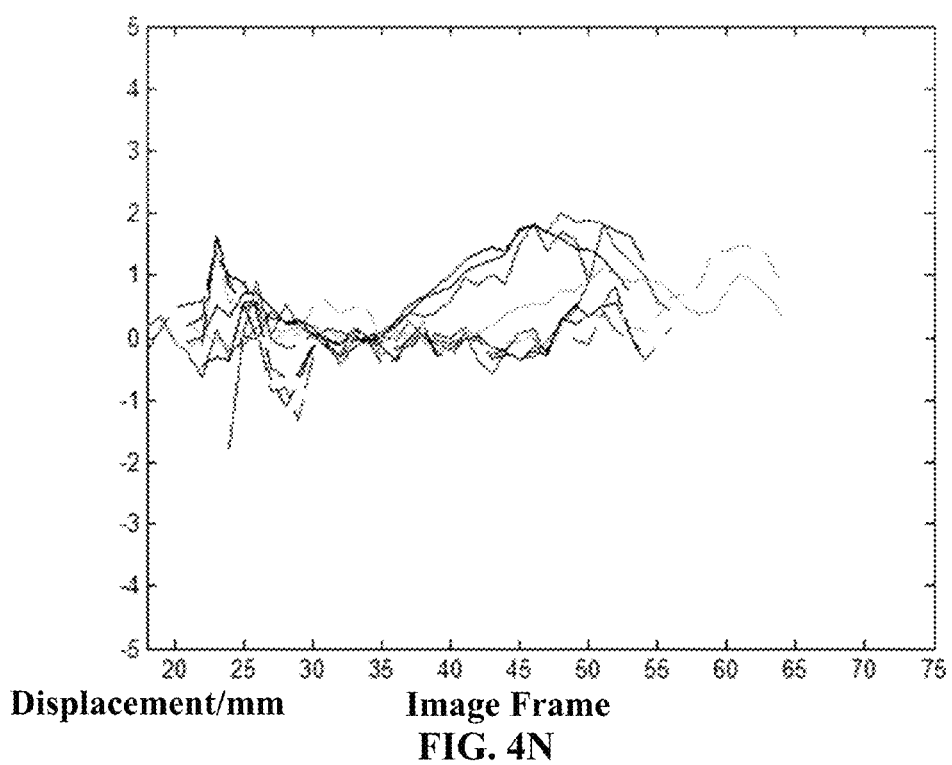
FIG. 4N illustrates a residual noise curve obtained by decomposing the original curve in FIG. 3B, where a solid line indicates variation in a horizontal ordinate (X-axis coordinate) of each feature point, and a dashed line indicates variation in a vertical ordinate (Y-axis coordinate) of each feature point.

After separation, the cardiac motion curve features good periodicity. As respiratory motion curve for all labeling points are compared with each other, it can be found that there is small difference between respiratory motion curves for feature points in the same angiography plane (as shown in FIGS. 4E and 4F). High-frequency components obtained by separation in FIGS. 4G and 4H are 0.54 times greater than that of the cardiac motion, cycles thereof are both 6 frames, and basically amplitudes thereof exceed 3 pixels, and errors caused by segmentation or skeleton extraction are within three pixels. FIGS. 4I, 4J, 4K and 4L illustrate rhythmic and abnormal cardiac motion (such as cardiac fremitus). FIGS. 4I, 4J, 4K and 4L are comparison between separated translational curves and manually-tracing translational curves, and it can be seen that they are identical to each other except for errors caused by manual tracing. FIGS. 4M and 4N illustrate residual motion curves of different separated motion, amplitudes thereof are less than three pixels due to segmentation and skeleton extraction, and motion components are completely separated.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for separating and estimating multiple motion parameters in an X-ray angiogram image, the method comprising:

(1) tracing structure feature points of vessels in a X-ray angiogram image sequence whereby obtaining tracing curves of said feature points $s_i(n)$, i=1, ..., I, n=1, ..., N; wherein I represents the number of the feature points, and N represents the number of image frames in said X-ray angiogram image sequence;

(2) obtaining a simulated translation curve $d_\alpha(n)$ according to a variation frame sequence $\{N_t, t=1, ..., T\}$ and a slope angle sequence $\{\alpha_t, t=1, ..., T-1\}$ of translational motion, where T represents the number of variations in motion directions;

(3) determining a cardiac motion signal cycle $N_c$ according to said X-ray angiogram image sequence, obtaining a multi-motion synthetic motion curve $\hat{s}_{i\alpha}^1(n) = s_i(n) - d_\alpha(n)$ without translational motion according to said tracing curve $s_i(n)$ and said simulated translation curve $d_\alpha(n)$, and processing said synthetic motion curve $\hat{s}_{i\alpha}^1(n)$ via Fourier frequency-domain filtering according to said cardiac motion signal cycle $N_c$ thereby obtaining a cardiac motion curve $\hat{c}_{i\alpha}(n)$;

(4) obtaining a residual motion curve $\hat{s}_{i\alpha}^2(n) = \hat{s}_{i\alpha}^1(n) - \hat{c}_{i\alpha}(n)$ with no translational motion signal or cardiac motion signal according to said synthetic motion curve $\hat{s}_{i\alpha}^1(n)$ and said cardiac motion curve $\hat{c}_{i\alpha}(n)$, processing said residual motion curve $\hat{s}_{i\alpha}^2(n)$ via Fourier frequency-domain filtering according to each respiratory motion signal cycle in a cycle range of $[3N_c, 10N_c]$, thereby obtaining a corresponding respiratory motion curve, obtaining an optimum respiratory motion curve $\hat{r}_{i\alpha}(n)$ and an optimum respiratory motion signal cycle $N_{ar}$ with respect to a current simulated translation curve using a fitting curve $\hat{r}'_{i\alpha}(n)$ closest to said residual motion curve $\hat{s}_{i\alpha}^2(n)$ as an optimum criteria;

(5) detecting whether an amplitude of a curve $\hat{h}'_{i\alpha}(n) = \hat{s}_{i\alpha}^2(n) - \hat{r}'_{i\alpha}(n)$ obtained according to said residual motion curve $\hat{s}_{i\alpha}^2(n)$ and said fitting curve $\hat{r}'_{i\alpha}(n)$ is less than three pixels, determining there is no high-frequency component if yes, otherwise processing said residual motion curve $\hat{s}_{i\alpha}^2(n)$ via Fourier frequency-domain filtering according to each high-frequency motion signal cycle in a cycle range of $[1/7N_c, 5/7N_c]$, thereby obtaining a corresponding high-frequency motion curve, obtaining an optimum high-frequency motion curve $\hat{h}_{i\alpha}(n)$ and an optimum high-frequency motion signal cycle $N_{ah}$ with respect to a current simulated translation curve using a fitting curve $\hat{h}'_{i\alpha}(n)$ closest to said high-frequency motion curve as an optimum criteria;

(6) obtaining a synthetic motion estimation curve $\hat{s}_{i\alpha}(n) = d_\alpha(n) + \hat{r}_{i\alpha}(n) + \hat{c}_{i\alpha}(n) + \hat{h}_{i\alpha}(n)$ according to said simulated translation curve $d_\alpha(n)$, said respiratory motion curve $\hat{r}_{i\alpha}(n)$, said cardiac motion curve $\hat{c}_{i\alpha}(n)$, and said high-frequency motion curve $\hat{h}_{i\alpha}(n)$, and obtaining an optimum translational motion curve, a cardiac motion curve, a respiratory motion curve, and a high-frequency motion curve using a tracing curve $s_i(n)$ closest to said synthetic motion estimation curve $\hat{s}_{i\alpha}(n)$ as an optimum criteria.

* * * * *